United States Patent [19]

Hirata

[11] Patent Number: 5,327,391

[45] Date of Patent: Jul. 5, 1994

[54] DOUBLE BUFFER TYPE ELASTIC STORE COMPRISING A PAIR OF DATA MEMORY BLOCKS

[75] Inventor: Hideyuki Hirata, Tokyo, Japan

[73] Assignee: NEC Corporation, Tokyo, Japan

[21] Appl. No.: 867,355

[22] Filed: Apr. 13, 1992

[30] Foreign Application Priority Data

Apr. 11, 1991 [JP] Japan .................. 3-078084

[51] Int. Cl.[5] .................................... G11C 8/00
[52] U.S. Cl. ..................... 365/233; 365/219; 365/230.04
[58] Field of Search .................... 365/233, 230.04, 219

[56] References Cited

U.S. PATENT DOCUMENTS

| | | | |
|---|---|---|---|
| 4,307,462 | 12/1981 | Mazzocchi | 370/102 |
| 4,370,462 | 1/1983 | Ikeguchi | |
| 4,849,937 | 7/1989 | Yoshimoto | 365/230.04 |
| 5,093,807 | 3/1992 | Hashimoto et al. | 365/230.09 |
| 5,121,354 | 6/1992 | Mandalia | 365/230.04 |
| 5,121,360 | 6/1992 | West et al. | 365/230.04 |

FOREIGN PATENT DOCUMENTS 57-15271 1/1982 Japan .................. 365/230.04

Primary Examiner—Eugene R. LaRoche
Assistant Examiner—Son Dinh
Attorney, Agent, or Firm—Sughrue, Mion, Zinn, Macpeak & Seas

[57] ABSTRACT

In an elastic store supplied with a sequence of reception data, a sequence of reception clock pulses, a sequence of reception frame pulses, a sequence of system clock pulses, and a sequence of system frame pulses comprising successive system frames each of which has a system frame phase, a first signal generating circuit alternately controls write-in operation of first and second data memory blocks in response to the reception clock pulses and the reception frame pulses. The first and the second data memory blocks thereby memorize the reception data as first and second memorized data, respectively. A second signal generating circuit alternately controls read-out operation of the first and the second data memory blocks in response to the system clock pulses and the system frame pulses. The first and the second data memory blocks thereby deliver the first and the second memorized data as first and second read-out data, respectively. A selector selects one of the first and the second read-out data as selected data and delivers the selected data as output data synchronized with the system frame phase within a predetermined phase difference.

2 Claims, 2 Drawing Sheets

DOUBLE BUFFER TYPE ELASTIC STORE COMPRISING A PAIR OF DATA MEMORY BLOCKS

BACKGROUND OF THE INVENTION

This invention relates to an elastic store for use in data transfer in a time division multiple communication network.

In such a time division multiple communication network, a data transmitting device and a data receiving device are supplied with a sequence of system clock pulses having a system clock phase and a predetermined clock period and a sequence of system frame pulses comprising successive frames each of which has a system frame phase and a predetermined frame period defining a frame length. The data transmitting device transmits transmission data together with transmission clock pulses synchronized with the system clock pulses and transmission frame pulses synchronized with the system frame pulses to the data receiving device through a time division transmission path. The data receiving device receives the transmission data, the transmission clock pulses, and the transmission frame pulses as a sequence of reception data, a sequence of reception clock pulses, and a sequence of reception frame pulses, respectively. The reception clock pulses have a clock phase deviated from the system clock phase. The reception frame pulses have a frame phase deviated from the system frame phase. These phase deviations are caused by the time division transmission path.

The data receiving device comprises an elastic store supplied with the reception data, the reception clock pulses, the reception frame pulses, the system clock pulses, and the system frame pulses. The elastic store is for producing output data synchronized with the system frame phase within a predetermined phase difference. The elastic store has a data memory block comprising a data memory, a write-in counter, and a read-out counter. The write-in counter is reset by each of the reception frame pulses and generates a write-in address signal to supply the write-in address signal to the data memory. In synchronism with the reception clock pulses, the data memory memorizes the reception data, as memorized data, from a leading address to a trailing address in ascending order in accordance with the write-in address signal. The read-out counter is reset by each of the system frame pulses and generates a read-out address signal to supply the read-out address signal to the data memory. In synchronism with the system clock pulses, the memorized data are read out of the data memory in accordance with the read-out address signal.

Inasmuch as the above-mentioned elastic store has a single data memory block, the memorized data stored in a certain address of the data memory are held during a predetermined period. In other words, it is impossible to write the reception data at the certain address until the memorized data stored in the certain address are read out of the data memory. For the reason, it is required that the data memory has a capacity larger than the frame length or has a capacity equal to 1/N of the frame length where N represents a positive integer greater than unity.

However, it is hard for the elastic store to have the data memory of a large capacity because a quantity of the transmission data per frame shows a tendency to increase as a transmission rate becomes high. If the capacity of the data memory is reduced, the capacity is restricted to 1/N of the frame length. In other words, a write-in period of the write-in counter and a read-out period of the read-out counter are restricted to 1/N of the frame length. If the data memory has the capacity which is not coincide with 1/N of the frame length, miss read-out operation may occur. For example, when last or trailing data in a certain frame are memorized at the leading address of the data memory, the trailing data are held no more than the predetermined clock period. In this event, when the read-out counter generates the read-out address signal representative of the leading address, content of the leading address in the data memory has already been rewritten from the trailing data of the certain frame to new data of a next frame. This means that the trailing data of the certain frame can not be read out of the data memory.

SUMMARY OF THE INVENTION

It is therefore an object of this invention to provide a double buffer type elastic store which is capable of voluntarily setting a write-in period of a write-in counter and a read-out period of a read-out counter without restriction of 1/N of a frame length.

It is another object of this invention to provide the double buffer type elastic store which can be applied to various time division multiple communication networks which utilize various clock pulses having various clock periods and utilize various frame pulses having various frame periods.

Other objects of this invention will become clear as the description proceeds.

On describing the gist of this invention, it is possible to understand that a double buffer type elastic store is supplied with a sequence of reception data, a sequence of reception clock pulses of a predetermined clock period, a sequence of reception frame pulses comprising successive reception frames each of which has a predetermined frame period, a sequence of system clock pulses of the predetermined clock period, and a sequence of system frame pulses comprising successive system frames each of which has the predetermined frame period and a system frame phase. The sequence of reception data, the sequence of reception clock pulses, and the sequence of reception frame pulses are propagated through a time division transmission path. The elastic store is for producing a sequence of output data synchronized with the system frame phase within a predetermined phase difference.

The above-understood elastic store comprises a first memory block supplied with the sequence of reception data for memorizing the sequence of reception data as first memorized data, a second memory block supplied with the sequence of reception data for memorizing the sequence of reception data as second memorized data, a first signal generating circuit supplied with the sequence of reception clock pulses and the sequence of reception frame pulses for alternately generating first and second write-in reset signals on reception of each of the reception frame pulses to alternately supply the first and the second write-in reset signals to the first and the second memory blocks, respectively, and generating an indication signal indicative of one of the first and the second memory blocks that is supplied with either the first or the second write-in reset signal. The first and the second memory blocks memorizes the sequence of reception data in response to the first and the second write-in reset signals, respectively. The elastic store further comprises a second signal generating circuit supplied with the sequence of system clock pulses, the sequence of system frame pulses, and the indication signal for alternately generating first and second read-out reset signals on reception of each of the system frame pulses to alternately supply the first and the second read-out reset signals to the first and the second memory blocks, respectively, and generating a selection signal indicative of one of the first and the second memory blocks that is supplied with either the first or the second read-out reset signal. The first and the second memory blocks deliver the first and the second memorized data, as first and second read-out data, in response to the first and the second read-out reset signals, respectively. The elastic store still further comprises a selector connected to the first and the second memory blocks for selecting one of the first and the second read-out data as selected read-out data in response to the selection signal to produce the selected read-out data as the sequence of output data.

DESCRIPTION OF PREFERRED EMBODIMENT

Figure 1:
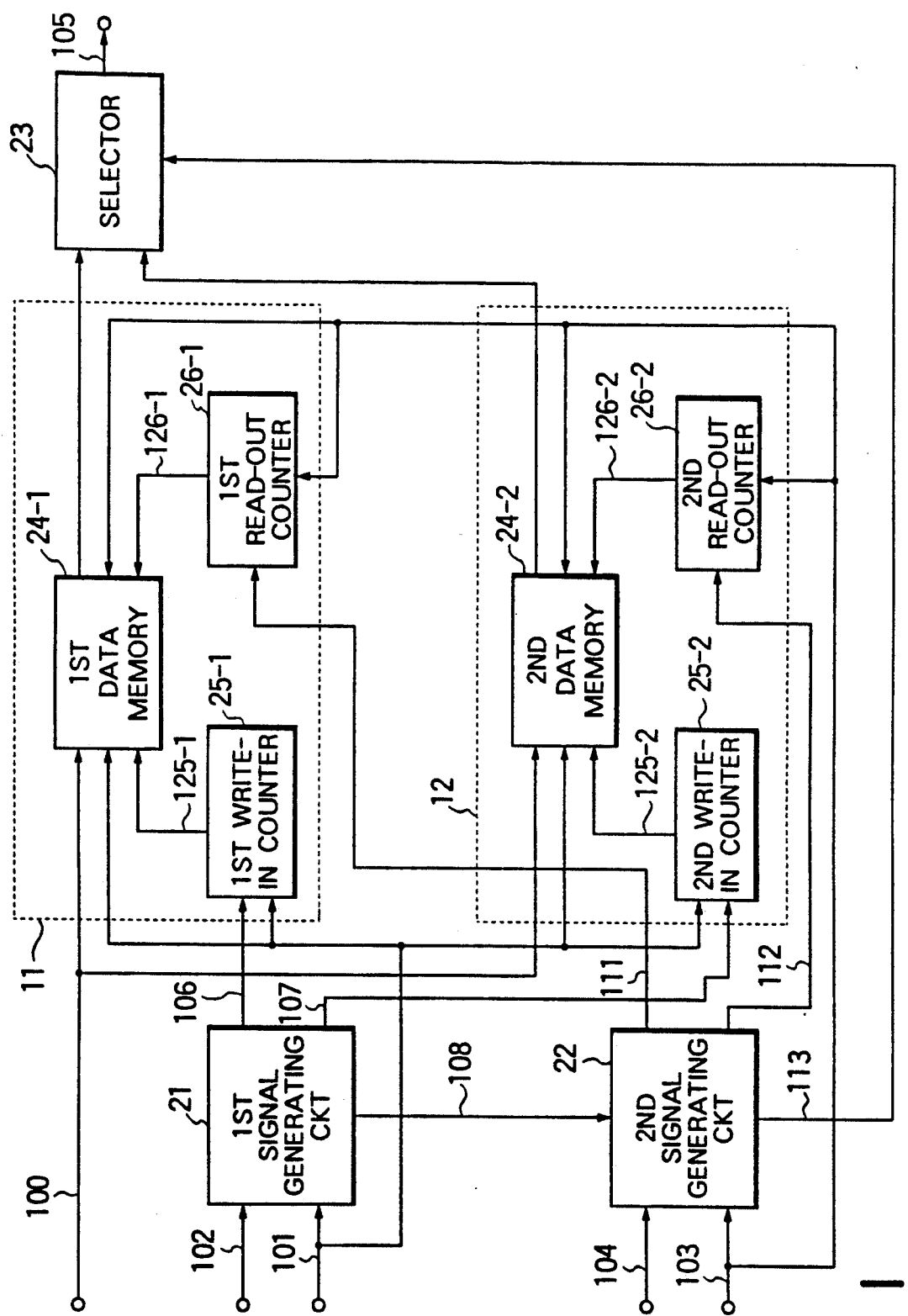
FIG. 1 is a block diagram of a double buffer type elastic store according to an embodiment of this invention.

Referring to FIG. 1, description will be made as regards a double buffer type elastic store according to a preferred embodiment of this invention. The elastic store is included in a data receiving device and is supplied with a sequence of reception data 100, a sequence of reception clock pulses 101 of a predetermined clock period, a sequence of reception frame pulses 102 comprising successive reception frames each of which has a predetermined frame period, a sequence of system clock pulses 103 having a system clock phase, and a sequence of system frame pulses 104 comprising successive system frames each of which has a system frame phase.

It is to be noted here that the reception and the system clock pulses 101 and 103 are generated by a common clock pulse generator (not shown). Similarly, the reception and the system frame pulses 102 and 104 are generated by a common frame pulse generator (not shown). The elastic store receives the reception clock pulses 101 and the reception frame pulses 102 together with the reception data 100 through a time division transmission path. Therefore, the reception data 100 are synchronized with the reception clock pulses 101 and have a reception frame phase synchronized with the reception frame pulses 102. The elastic store directly receives the system clock pulses 103 and the system frame pulses 104 from the common clock pulse generator and the common frame pulse generator, respectively. Therefore, the system clock pulses 103 have the predetermined clock period while the system frame pulses 104 have the predetermined frame period. However, the reception clock pulses 101 have a reception clock phase deviated from the system clock phase. The reception frame pulses 102 have a reception frame phase deviated from the system frame phase. This is because the reception clock pulses 101 and the reception frame pulses 102 propagate through the time division transmission path. Generally, the elastic store is designed so that each of the reception frames has a phase difference within plus or minus eight clocks relative to the system frame phase.

The elastic store is for producing a sequence of output data 105 synchronized with the system frame phase within a predetermined phase difference. The elastic store comprises first and second memory blocks 11 and 12, first and second signal generating circuits 21 and 22, and a selector 23. The first memory block 11 is supplied with the sequence of reception data 100 and memorizes the sequence of reception data 100 as first memorized data. The second memory block 12 is supplied with the sequence of reception data 100 and memorizes the sequence of reception data 100 as second memorized data. The first signal generating circuit 21 is supplied with the sequence of reception clock pulses 101 and the sequence of reception frame pulses 102. The first signal generating circuit 21 alternately generates first and second write-in reset signals 106 and 107 on reception of each of the reception frame pulses 102 to alternately supply the first and the second write-in reset signals 106 and 107 to the first and the second memory blocks 11 and 12, respectively. The first signal generating circuit 21 further generates an indication signal 108 indicative of one of the first and the second memory blocks 11 and 12 that is supplied with either the first or the second write-in reset signal 106 or 107. In other words, the indication signal 108 indicates the first memory block 11 when the first signal generating circuit 21 supplies the first write-in reset signal 106 to the first memory block 11. On the contrary, the indication signal 108 indicates the second memory block 12 when the first signal generating circuit 21 supplies the second write-in reset signal 107 to the second memory block 12.

The second signal generating circuit 22 is supplied with the sequence of system clock pulses 103, the sequence of system frame pulses 104, and the indication signal 108. The second signal generating circuit 22 alternately generates first and second read-out reset signals 111 and 112 on reception of each of the system frame pulses 104 to alternately supply the first and the second read-out reset signals 111 and 112 to the first and the second memory blocks 11 and 12, respectively. The second signal generating circuit 22 further generates a selection signal 113 indicative of one of the first and the second memory blocks 11 and 12 that is supplied with either the first or the second read-out reset signal 111 or 112. In other words, the selection signal 113 indicates the first memory block 11 when the second signal generating circuit 22 supplies the first read-out reset signal 111 to the first memory block 11. The selection signal 113 indicates the second memory block 12 when the second signal generating circuit 22 supplies the second read-out reset signal 112 to the second memory block 12. In response to the first and the second read-out reset signals 111 and 112, the first and the second memory blocks 11 and 12 deliver the first and the second memorized data, respectively, as first and second read-out data. The selector 23 is connected to the first and the second memory blocks 11 and 12 and is for selecting one of the first and the second read-out data as selected read-out data in response to the selection signal 113. The selector 23 selects the first read-out data as the selected read-out data when the selection signal 113 indicates the first memory block 11. If the selection signal 113 indicates the second memory block 12, the selector 23 selects the second read-out data as the selected read-out data. The selector 23 produces the selected read-out data as the sequence of output data 105.

The first memory block 11 comprises a first data memory 24-1, a first write-in counter 25-1, and a first read-out counter 26-1. Similarly, the second memory block 12 comprises a second data memory 24-2, a second write-in counter 25-2, and a second read-out counter 26-2. The first write-in counter 25-1 is supplied with the sequence of reception data 100 and the sequence of reception clock pulses 101 and memorizes the sequence of reception data 100 as the first memorized data. The first write-in counter 25-1 is connected to the first signal generating circuit 21 and is supplied with the sequence of reception clock pulses 101. The first write-in counter 25-1 is reset by the first write-in reset signal 106 and generates a first write-in address signal 125-1 in synchronism with the sequence of reception clock pulses 101 to supply the first write-in address signal 125-1 to the first data memory 24-1. The first read-out counter 26-1 is connected to the second signal generating circuit 22 and is supplied with the sequence of system clock pulses 103. The first read-out counter 26-1 is reset by the first read-out reset signal 111 and generates a first read-out address signal 126-1 in synchronism with the sequence of system clock pulses 103 to supply the first read-out address signal 126-1 the first data memory 24-1.

The second data memory is supplied with the sequence of reception data 100 and the sequence of reception clock pulses 101 and memorizes the sequence of reception data 100 as the second memorized data. The second write-in counter 25-2 is connected to the first signal generating circuit 21 and is supplied with the sequence of reception clock pulses 101. The second write-in counter 25-2 is reset by the second write-in reset signal 107 and generates a second write-in address signal 125-2 in synchronism with the sequence of reception clock pulses 101 to supply the second write-in address signal 125-2 to the second data memory 24-2. The second read-out counter 26-2 is connected to the second signal generating circuit 22 and is supplied with the sequence of system clock pulses 103. The second read-out counter 26-2 is reset by the second read-out reset signal 112 and generates a second read-out address signal 126-2 in synchronism with the sequence of system clock pulses 103 to supply the second read-out address signal 126-2 to the second data memory 24-2.

In addition, each of the first and the second write-in counters 25-1 and 25-2 and the first and the second read-out counters 26-1 and 26-2 is an autonomous reset type counter which autonomously resets count operation thereof in accordance with an address length of the first and the second data memories 24-1 and 24-2. Let the address length of the first and the second data memories 24-1 and 24-2 be equal to sixteen bits. In this event, each of the first and the second write-in counters 25-1 and 25-2 and the first and the second read-out counters 26-1 and 26-2 is a four bit binary counter and autonomously resets the count operation every sixteen clocks. The first and the second write-in counters 25-1 and 25-2 may be called first and second write-in address generators, respectively. The first and the second read-out counters 26-1 and 26-2 may be called first and second read-out address generators, respectively.

Figure 2:
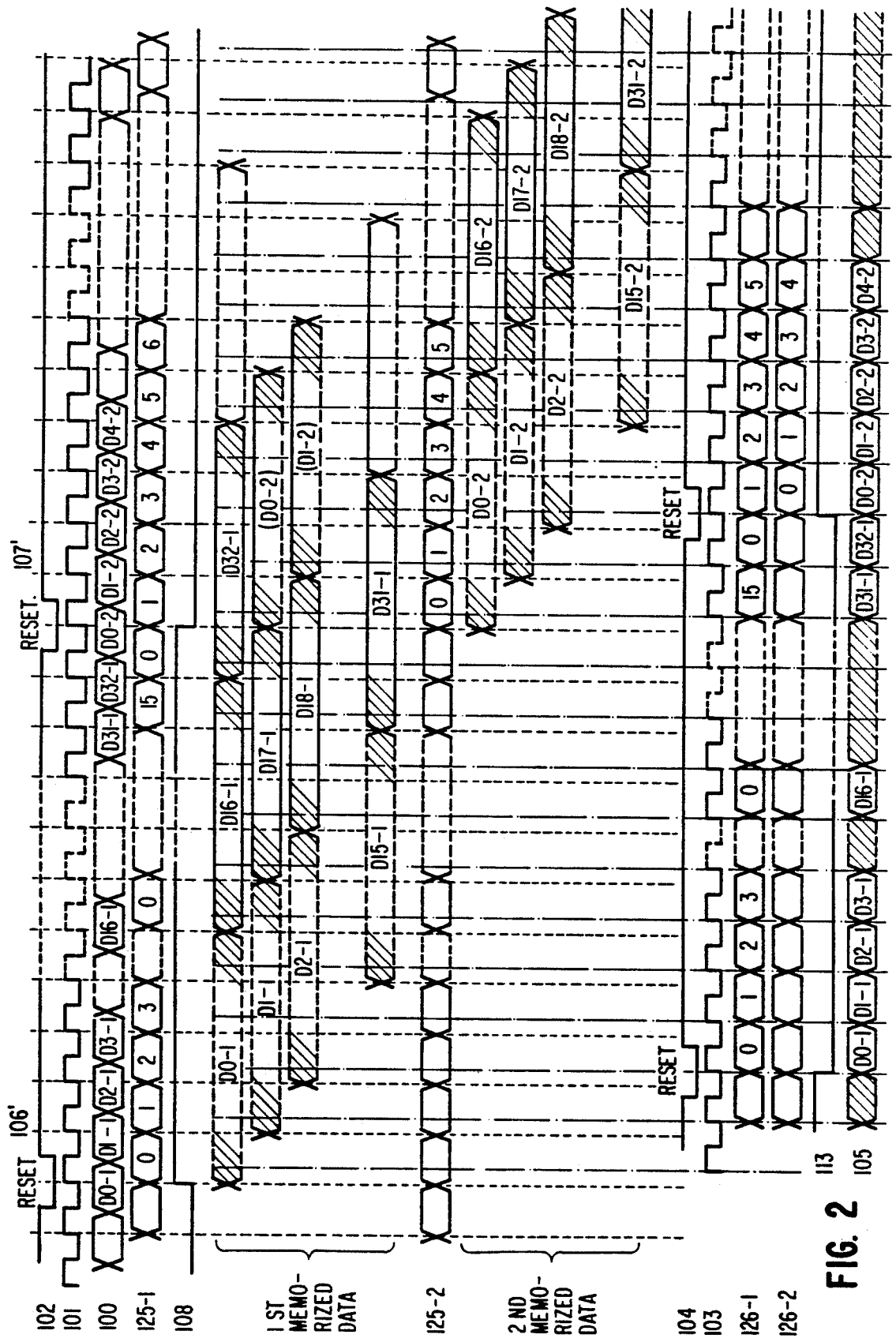
FIG. 2 shows a time chart for use in describing operation of the elastic store illustrated in FIG. 1.

Referring to FIG. 2 together with FIG. 1, the description will proceed to operation of the elastic store. Let each of the first and the second data memories 24-1 and 24-2 have a capacity of sixteen addresses, namely, zeroth through fifteenth addresses. Each of the reception and the system frame pulses 102 and 104 has the frame length equal to thirty-three clocks in number. In this event, each of the first and the second write-in counters 25-1 and 25-2 has a write-in period equal to the thirty-three clocks. Similarly, each of the first and the second read-out counters 26-1 and 26-2 has a read-out period equal to the thirty-three clocks. It is to be noted here that the capacity of each of the first and the second data memories 24-1 and 24-2 is not equal to 1/N of the frame length where N represents a positive integer greater than unity. In other words, each of the first and the second write-in counters 25-1 and 25-2 and the first and the second read-out counters 26-1 and 26-2 is not restricted by 1/N of the frame length. In FIG. 2, the reception data 100 are illustrated for two frames. A former frame comprises zeroth through thirty-second partial data D0-1 through D32-1 while a next frame comprises zeroth through thirty-second partial data D0-2 through D32-2. The zeroth partial data D0-1 and D0-2 may be called leading data while the thirty-second partial data D32-1 and D32-2 may be called trailing data. Each of the partial data is represented by a single bit or a plurality of bits.

Under the condition, let one of the reception frame pulses 102 be received two clocks previous to one of the system frame pulses 104. On reception of the above-mentioned one off the reception frame pulses 102, the first signal generating circuit 21 generates at first the first write-in reset signal 106 and supplies the first write-in reset signal 106 to the first write-in counter 25-1. As symbolically illustrated by an arrow line 106' in FIG. 2, the first write-in counter 25-1 is reset by the first write-in reset signal 106 and generates the first write-in address signal 125-1. The first write-in address signal 125-1 represents one of the zeroth through the fifteenth addresses of the first data memory 24-1 at a time. Supplied with the first write-in address signal 125-1, the first data memory 24-1 memorizes the zeroth through a fifteenth partial data D0-1 through D15-1 at the zeroth through the fifteenth addresses, as zeroth through fifteenth memorized partial data, in address order in synchronism with the reception clock pulses 101.

After generation of the first write-in reset signal 106, the first signal generating circuit 21 further generates the indication signal 108 indicative of the first memory block 11. The indication signal 108 indicative of the first memory block 11 lasts until the first signal generating circuit 21 receives a next one of the reception frame pulses 102. Inasmuch as the indication signal 108 indicates the first memory block 11, the second signal generating circuit 22 generates the first read-out reset signal 111 on reception of the above-mentioned one of the system frame pulses 104. The first read-out reset signal 111 is supplied to the first read-out counter 26-1. As symbolically illustrated by an arrow line 111' in FIG. 2, the first read-out counter 26-1 is reset by the first read-out reset signal 111 and generates the first read-out address signal 126-1. The first read-out address signal 126-1 represents one of the zeroth through the fifteenth addresses of the first data memory 24-1 at a time. Supplied with the first read-out address signal 126-1, the first data memory 24-1 delivers the zeroth through the fifteenth memorized partial data D0-1 through D15-1, as zeroth through fifteenth read-out partial data, in address order in synchronism with the system clock pulses 103.

After generation of the first read-out reset signal 111, the second signal generating circuit 22 further generates the selection signal 113 representative of the first memory block 11. The selection signal 113 representative of the first memory block 11 lasts until the second signal generating circuit 22 receives a next one of the system frame pulses 104. Supplied with the selection signal 113 representative of the first memory block 11, the selector 23 selects the zeroth through the fifteenth read-out partial data delivered from the first data memory 24-1 and delivers the zeroth through the fifteenth read-out partial data as the output data 105.

Turning back to the first write-in counter 25-1, when the first write-in counter 25-1 counts the reception clock pulses 101 up to a fifteenth reception clock, the first write-in counter 25-1 autonomously resets the count operation and counts again the reception clock pulses 101 to produce the first write-in address signal 125-1. In response to the first write-in address signal 125-1, the first data memory 24-1 memorizes afresh sixteenth through thirty-first partial data D16-1 through D31-1 at the zeroth through the fifteenth addresses in address order as sixteenth through thirty-first memorized partial data.

On the other hand, when the first read-out counter 26-1 counts the system clock pulses 103 up to a fifteenth reception clock, the first read-out counter 26-1 autonomously resets the count operation and counts again the system clock pulses 103 to produce the first read-out address signal 126-1. In response to the first read-out address signal 126-1, the first data memory 24-1 delivers the sixteenth through the thirty-first memorized partial data D16-1 through D31-1 in address order as sixteenth through thirty-first read-out partial data. The selector 23 selects the sixteenth through the thirty-first read-out partial data because the selection signal 113 indicates the first memory block 11. Thus, the selector 23 delivers the sixteenth through the thirty-first read-out partial data as the output data 105.

In the first write-in counter 25-1, after the thirty-first partial data D31-1 are memorized at the fifteenth address of the first data memory 24-1, the first write-in counter 25-1 autonomously resets the count operation and counts again the reception clock pulses 101 to produce the first write-in address signal. As a result, the first data memory 24-1 memorizes the trailing data, namely, the thirty-second partial data D32-1 of the former frame, at the zeroth address as thirty-second memorized partial data in response to the first write-in address signal 125-1 representative of the zeroth address. Although, the first data memory 24-1 memorizes the zeroth through a fourteenth partial data D0-2 through D14-2 of the next frame at the first through the fifteenth addresses in response to the first write-in address signal 125-1, these partial data are not utilized any longer for the reason mentioned hereinunder.

When the thirty-second partial data D32-1 are memorized in the first data memory 24-1, the first signal generating circuit 21 receives the above-mentioned next one of the reception frame pulses 102. Simultaneously, the first signal generating circuit 21 generates the second write-in reset signal 107 and supplies the second write-in reset signal 107 to the second write-in counter 25-2. As symbolically illustrated by an arrow line 107' in FIG. 2, the second write-in counter 25-2 is reset by the second write-in reset signal 107 and counts the system clock pulses 103 to supply the second write-in address signal to the second data memory 24-2. The second write-in address signal represents one of the first through the fifteenth addresses of the second data memory 24-2 at a time. The second data memory 24-2 memorizes the zeroth through the thirty-second partial data D0-2 through D32-2 of the next frame as zeroth through thirty-first memorized partial data in the manner mentioned in conjunction with the first data memory 24-1. It is to be noted here that the second data memory 24-2 memorizes the zeroth partial data D0-2 of the next frame at the zeroth address just after the first data memory 24-1 memorizes the thirty-second partial data D32-1 at the zeroth address. At this time, the above-mentioned next one of the system frame pulses 104 is not yet received by the second signal generating circuit 22.

Attention will be directed to the thirty-second memorized partial data D32-1 memorized at the zeroth address of the first data memory 24-1. After delivery of the thirty-first memorized partial data D31-1, the first data memory 24-1 delivers the thirty-second memorized partial data D32-1, as thirty-second read-out partial data, in response to the first read-out address signal 126-1 representative of the zeroth address. It is to be noted here that the selection signal 113 representative of the first memory block 11 lasts until the first read-out counter 26-1 generates the first write-in address signal 126-1 representative of the zeroth address. In this event, the selector 23 selects the thirty-second read-out partial data of the former frame in addition to the sixteenth through the thirty-first read-out partial data because the selector 23 still receives the selection signal 113 representative of the first memory block 11. Thus, the selector 23 delivers the thirty-second read-out partial data after the sixteenth through the thirty-first read-out partial data as the output data 105.

It is to be noted here that the thirty-second memorized partial data D32-1 of the former frame are held in the first data memory 24-1 for several clocks. This means that the thirty-second memorized partial data D32-1 are surely read out of the first data memory 24-1 regardless of whether the reception data 100 has the phase difference or not.

After delivery of the sixteenth through the thirty-second read-out partial data of the former frame, the second signal generating circuit 22 receives the above-mentioned next one of the system frame pulses 104. Simultaneously, the second signal generating circuit 22 generates the second read-out reset signal 112 and supplies the second read-out reset signal 112 to the second read-out counter 26-2. As symbolically illustrated by an arrow line 112' in FIG. 2, the second read-out counter 26-2 is reset by the second read-out reset signal 112 and counts the system clock pulses 103 to generate the second read-out address signal 126-2. The second read-out address signal 126-2 is supplied to the second data memory 24-2. In the manner mentioned in conjunction with the first data memory 24-1, the second data memory 24-2 delivers the zeroth through the thirty-second memorized partial data D0-2 through D32-2 of the next frame as zeroth through thirty-second read-out partial data, in synchronism with the system clock pulses 103.

Inasmuch as the first signal generating circuit 21 generates the indication signal 108 representative of the second memory block 12 after generation of the second write-in reset signal 111, the second signal generating circuit 22 generates the selection signal 113 representative of the second memory block 12 after generation of the second read-out reset signal 112. Accordingly, the selector 23 selects the zeroth through the thirty-second read-out partial data as the selected data and delivers the selected data as the output data 105 of the next frame.

In the elastic store according to this invention, the first and the second memory blocks are alternately utilized in each of the frames as apparent from the above description. The elastic store can be utilized in common for various time division multiple communication networks which have various frame lengths. The elastic store can be implemented by an LSI and can therefore be obtained by low cost.

While this invention has thus far been described in conjunction with a single embodiment thereof, it will readily be possible for those skilled in the art to put this invention into practice in various other manners.

What is claimed is:

1. A double buffer type elastic store supplied with a sequence of reception data, a sequence of reception clock pulses of a predetermined clock period, a sequence of reception frame pulses comprising successive reception frames each of which has a predetermined frame period, a sequence of system clock pulses of said predetermined clock period, and a sequence of system frame pulses comprising successive system frames each of which has said predetermined frame period and a system frame phase for producing a sequence of output data synchronized with said system frame phase within a predetermined phase difference, said sequence of reception clock pulses and said sequence of reception frame pulses being propagated through a time division transmission path, said elastic store comprising:

a first memory block which receives said sequence of reception data and memorizes said sequence of reception data as first memorized data;

a second memory block which receives said sequence of reception data and memorizes said sequence of reception data as second memorized data;

a first signal generating circuit supplied with said sequence of reception clock pulses and said sequence of reception frame pulses for alternately generating first and second write-in reset signals on reception of each of said reception frame pulses to alternately supply said first and said second write-in reset signals to said first and said second memory blocks, respectively, and generating an indication signal indicative of one of said first and said second memory blocks that is supplied with either said first or said second write-in reset signal, said first and said second memory blocks alternately memorizing said sequence of reception data every other frame in response to said first and said second write-in reset signals, respectively;

a second signal generating circuit supplied with said sequence of system clock pulses, said sequence of system frame pulses, and said indication signal for alternately generating first and second read-out reset signals on reception of each of said system frame pulses to alternately supply said first and said second read-out reset signals to said first and said second memory blocks, respectively, and generating a selection signal indicative of one of said first and said second memory blocks that is supplied with either said first or said second read-out reset signal, said first and said second memory blocks alternately delivering said first and said second memorized data every other frame, as first and second read-out data, in response to said first and said second read-out reset signals, respectively; and a selector connected to said first and said second memory blocks for selecting one of said first and said second read-out data as selected read-out data in response to said selection signal to produce said selected read-out data as said sequence of output data.

2. A double buffer type elastic store as claimed in claim 1, wherein said first memory block comprises:

a first data memory which receives said sequence of reception data and said sequence of reception clock pulses and memorizes said sequence of reception data as said first memorized data;

a first write-in address generator supplied with said sequence of reception clock pulses and reset by said first write-in reset signal for generating a first write-in address signal in synchronism with said sequence of reception clock pulses to supply said first write-in address signal to said first data memory; and a first read-out address generator supplied with said sequence of system clock pulses and reset by said first read-out reset signal for generating a first read-out address signal in synchronism with said sequence of system clock pulses to supply said first read-out address signal to said first data memory;

said second memory block comprising:

a second data memory which receives said sequence of reception data and said sequence of reception clock pulses and memorizes said sequence of reception data as said second memorized data;

a second write-in address generator supplied with said sequence of reception clock pulses and reset by said second write-in reset signal for generating a second write-in address signal in synchronism with said sequence of reception clock pulses to supply said second write-in address signal to said second data memory; and a second read-out address generator supplied with said sequence of system clock pulses and reset by said second read-out reset signal for generating a second read-out address signal in synchronism with said sequence of system clock pulses to supply said second read-out address signal to said second data memory.

* * * * *